May 6, 1930.　　　　M. P. GRAHAM　　　　1,757,305

ROD COUPLING

Filed Dec. 19, 1925

INVENTOR:
MATTHEW P. GRAHAM
By
A. Emerkel,
ATTORNEY

UNITED STATES PATENT OFFICE

MATTHEW P. GRAHAM, OF DETROIT, MICHIGAN, ASSIGNOR TO THOMPSON PRODUCTS, INCORPORATED, OF CLEVELAND, OHIO, A CORPORATION OF OHIO

ROD COUPLING

Application filed December 19, 1925. Serial No. 76,449.

The invention relates to ball joint rod couplings such as are employed at the ends of tie rods used in automobiles.

The object of the invention is to provide a joint of this character which can be manufactured at a low cost, may be readily assembled, will provide means for adjustment between centers of the ball stud shanks when used in a tie rod, and for the purpose of taking up wear, and which will automatically take up looseness in the joint so as to prevent rattling.

These objects are attained by the structure hereinafter described and illustrated in the accompanying drawings. The invention is capable of embodiment in various forms and combinations, but the best form which I have thus far contemplated is shown in the annexed drawings and which I shall now describe.

Referring to the annexed drawings.

Figure 2:
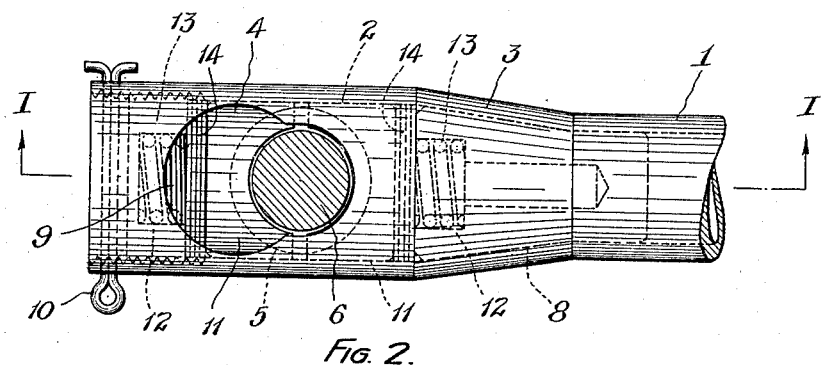
Fig. 2 is a sectional plan view through the line II—II of Fig. 1.
Figure 1:
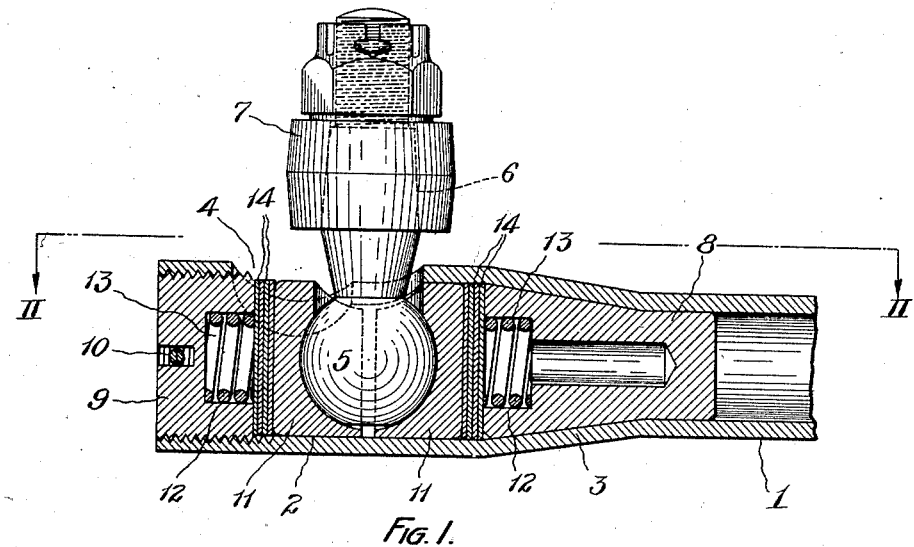
Figure 1 is a vertical longitudinal section through the end of a tie rod and the ball joint mounted therein.

Referring to the drawings in detail, a tie rod 1 of tubular form in the embodiment shown, has an enlarged hollow end forming an enlarged cavity 2 and connected to the main portion of the rod 1 by an integral inclined wall 3. In a wall of this cavity is formed an opening 4, of a size to admit the ball 5 of a ball stud, the shank 6 of which extends upwardly through the opening 4 and is adapted to form a bearing surface for an apertured arm 7 which forms a part of the member to be connected to the rod 1, such as the steering knuckle of an automobile.

Seated in the rod 1 is an abutment 8 which forms the inner wall of a ball joint housing. The outer end of the cavity 2 is closed by a retaining plug 9, engaged with the end of the rod 1 by means of external threads which take into internal threads at the end of the rod. The retaining plug is held in any desired adjusted position by any suitable means, in the embodiment shown by a cotter pin 10. Seated between the inner faces, respectively, of the abutment 8 and the retaining plug 9, are wear resisting ball seats 11 having spherical segmental bearing surfaces to engage and substantially envelop the ball of the ball stud. The bases, or outer surfaces of the ball seats are plain and are arranged in planes parallel, respectively, to the inner faces of the abutment 8 and the retaining plug 9. The abutment 8 and the retaining plug 9 are each provided with recesses 12 which serve to house coil springs 13 or other resilient means, acting to press the ball seats into engagement with the ball of the ball stud, whereby any looseness in the joint due to wear is automatically taken up, and rattling of the joint is prevented.

The springs 13, however, merely serve to prevent rattling and do not transmit the forces exerted by the ball stud and ball seats to the tie rod. Such forces are transmitted directly from the ball seats to the tie rod through the plug 9 and abutment 8 with which the ball seats are in solid contact. There is thus a solid channel for the transmission of forces.

By virtue of the parallel relation between the bases of the ball seats and the adjacent surfaces of the abutment and retaining plug, shims 14 are adapted to be inserted between such parts, at any time, either to provide for adjustment of the distance between centers of the ball studs or to take up excessive wear in the joint. There is thus, in effect, solid contact still between the adjacent surfaces of the bases of said ball seats and the abutment 8 and retaining plug 9, respectively.

From the above description it will be seen that I have provided a construction which meets all requirements of devices of this kind, which may be manufactured at small cost, yet which is safe, strong and durable and capable of ready adjustment to meet all conditions.

While I have described a specific construction it will be apparent that the specific details may be varied without departing from the spirit of my invention. It is therefore to be understood that the invention includes all structures comprehended within the terms of the appended claim.

What I claim is:

In a rod coupling, a rod having a hollow end forming a ball joint housing, the wall of said housing having an opening, a ball seat abutment at the inner end of said housing and an adjustable retaining plug at the outer end, said abutment and plug having recesses in their opposing faces, ball seats in said housing in effective solid contact with said faces respectively, a ball of a ball stud between said ball seats and substantially enveloped thereby with its shank extending through said wall opening and resilient means under compression within said recesses acting against said ball seats to prevent rattle of the joint.

Signed by me this 25th day of November, 1925.

MATTHEW P. GRAHAM.